United States Patent

[11] 3,627,106

[72] Inventor Edward L. Winfield
    Chesterfield County, Va.
[21] Appl. No. 845,801
[22] Filed July 29, 1969
[45] Patented Dec. 14, 1971
[73] Assignee Reynolds Metals Company
    Richmond, Va.

[54] CONVEYOR INFEED MECHANISM
    10 Claims, 6 Drawing Figs.
[52] U.S. Cl. ..................................... 198/34,
                                                198/173
[51] Int. Cl. ....................................... B65g 47/26
[50] Field of Search ............................ 198/20, 34,
                                                173

[56] References Cited
    UNITED STATES PATENTS
2,403,673  7/1946  Mead .......................... 198/34
2,610,725  9/1952  Schieser ....................... 198/34
3,231,062  1/1966  Phillips ........................ 198/34

FOREIGN PATENTS
1,075,304  7/1967  Great Britain ................ 198/34

Primary Examiner—Edward A. Sroka
Attorney—Glenn, Palmer, Lyne, Gibbs & Thompson

ABSTRACT: An apparatus for feeding articles from one conveyor means to another conveyor means at right angles thereto. Articles are initially guided while being fed on a line conveyor into engagement with a protruding stop abutment producing a backlog of articles. In timed sequence, an article is released by escapement or article release means such as opposed pneumatic cylinders which move an article transversely on the line conveyor without skewing. A released article is fed by an overlap conveyor means to a feed finger means which feeds the article to a cross feed conveyor means. Toward the end of the delivery of the cross feed conveyor, the article is decelerated. Means are provided for maintaining the feed fingers substantially vertical even as they pass over a forward sprocket adjacent the crossfeed conveyor. The apparatus permits the line conveyor, the overlap conveyor and a feed finger conveyor to advance continuously while the crossfeed conveyor advances intermittently.

Patented Dec. 14, 1971

INVENTOR
Edward L. Winfield

BY
Glenn Palmer, Lyne,
Libby & Thompson
ATTORNEYS

INVENTOR
Edward L. Winfield

BY Glenn, Palmer, Lyne, Gibbs
& Thompson  ATTORNEYS

Patented Dec. 14, 1971

INVENTOR
Edward L. Winfield

BY Glenn, Palmer, Lyne, Gibbs
& Thompson ATTORNEYS

CONVEYOR INFEED MECHANISM

The present invention relates to an apparatus for feeding articles from one conveyor means to another conveyor means at right angles thereto and more particularly to an apparatus wherein continuously moving infeed conveyor means may transfer loosely grouped articles to an intermittently fed crossfeed conveyor at high speeds without tumbling or damaging the articles.

Heretofore, the inability to feed a plurality of articles at right angles to a conveyor line has resulted in an inordinately long input conveyor line which is relatively undesirable for installation in existing assembly plant locations or alternatively has resulted in the deployment of a right angle input feed which has been incapable of keeping up with the speed of the machine.

In accordance with the present invention, these shortcomings and disadvantages are effectively overcome by a more rapid feeding of articles to a crossfeed conveyor which nevertheless permits loosely grouped articles to be fed to a package making machine while avoiding shocking of the articles and thereby causing individual articles to fall and create a jam or malfunction.

Thus in a preferred form of the present invention, loosely grouped articles standing in an open-topped tray, sometimes referred to as a shipper, are guided along an input line conveyor into engagement with a stop abutment means which protrudes over the input line conveyor and thereby produces a backlog of trays. The input line conveyor advances continuously and the stop abutment means causes slippage between stopped articles or trays and the conveyor belt. In timed sequence, an escapement means, constituting a pacer means, permits an article containing tray to be released and advanced toward a crossfeed conveyor.

Also in accordance with a preferred form of the present invention, the escapement means or pacer means constitutes oppositely mounted dual acting pneumatic cylinders which move an article or tray transversely on the line conveyor while concurrently preventing skewing thereof, thereby permitting rapid feeding of articles to be packaged. The released article is fed forward by an overlap conveyor means toward a crossfeed conveyor on which the articles may either be fed away for packing or subjected to an additional operation such as being enveloped in a heat shrinkable film.

Before reaching the crossfeed conveyor, the released article or tray is delivered to a finger feed conveyor means which also advances continuously in the manner of the input line conveyor and the overlap conveyor. Means are provided on the feed finger conveyor means to decelerate the released article immediately prior to its reception on the cross feed conveyor means. Because the finger spacing on the finger conveyor means is over twice the length of the article to be packaged, timing is not critical.

The escapement means, preferably comprising oppositely mounted dual operated pneumatic cylinders, engage opposite sides of the article to be released, thereby not only effecting the article's release from the stop abutment means but also avoiding skewing of the article on the line conveyor. The feed finger conveyor means is mechanically linked to the crossfeed conveyor means so that the articles may be fed at any desired machine speed. As a further adjunct in avoiding criticality insofar as timing is concerned, means are provided for delaying the rise of the fingers from behind an article to be conveyed.

The inherent advantages and improvements of the present invention will become more readily apparent upon considering the following detailed description of the invention and by reference to the drawings in which.

Figure 1:
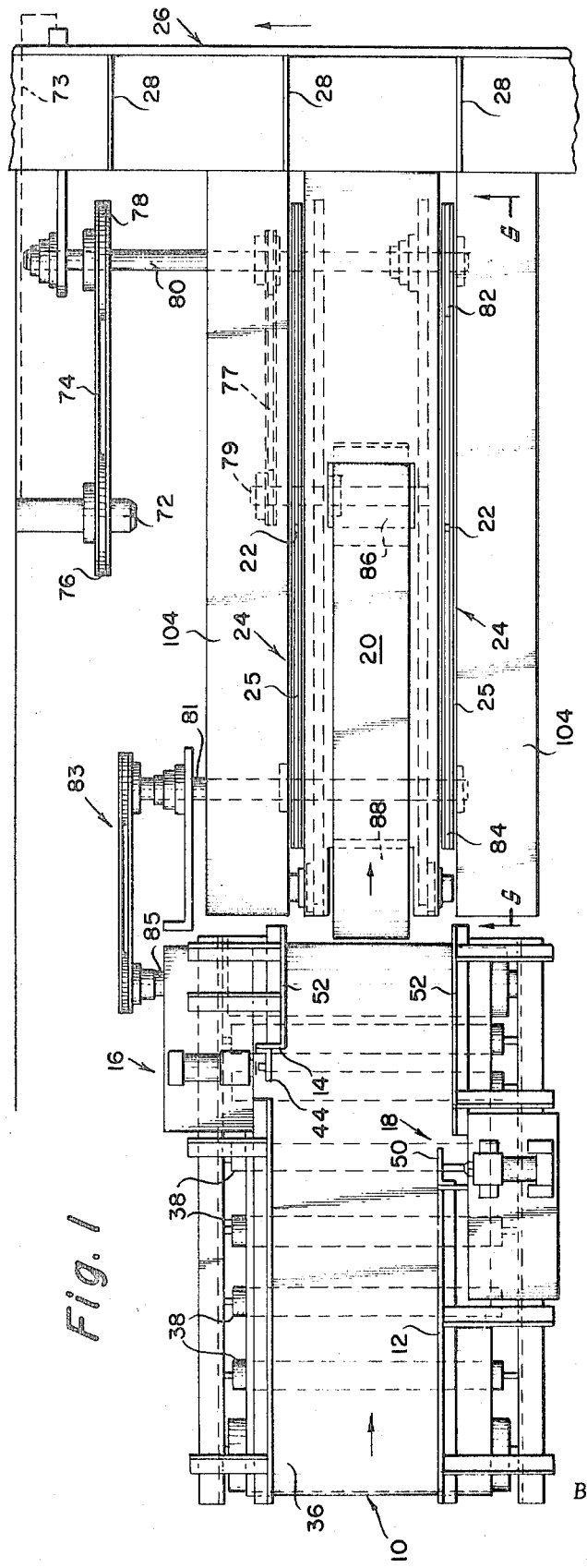
FIG. 1 is a top plan view illustrating the general arrangement of a preferred form of the present invention.

While the various features of this invention are hereinafter illustrated and described with respect to the specific embodiments of an article which comprises a series of cylindrical objects such as cans in a tray, it is to be understood that the various features of this invention can be utilized singly or in a variety of combinations with any desired article.

Therefore, this invention is not to be limited merely to the embodiments illustrated in the drawings because the drawings are utilized herein merely to illustrate one of a wide variety of uses of this invention.

Figure 2:
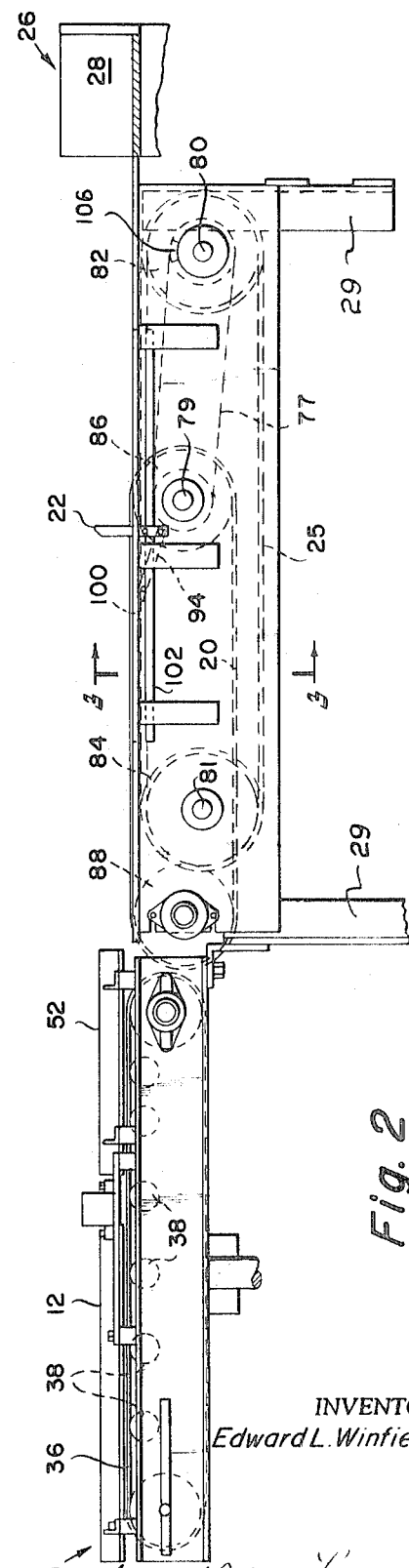
FIG. 2 is a side elevational view of the apparatus of FIG. 1.

Referring now to FIGS. 1 and 2 of the drawings, there is illustrated an input line conveyor indicated generally at 10 provided with guide members 12 in order to direct an article or tray to be conveyed into engagement with a stop abutment means 14. The latter constitutes a lateral projection over the surface of input line conveyor 10 whereby an accumulation of articles or trays may be obtained.

Escapement or article release means are indicated generally at 16 and 18. These article release means constitute a pacer means whereby individual articles or trays may be released in timed sequence from the stop abutment means 14 in a manner to be described hereinafter. After an article has been released, the article is delivered by the continuously moving input line conveyor 10 to an overlap conveyor means 20 which also advances continuously. The overlap conveyor 20 delivers the article or tray to cooperating pairs of feed fingers 22 on a feed finger conveyor means indicated generally at 24 which constitutes a chain conveyor 25. The feed fingers 24 feed an article or tray to be conveyed to a cross feed conveyor indicated generally at 26 which is provided with dividers 28 in order to establish compartments for an article or tray being delivered. Suitable support means such as leg supports 29 are provided for the conveyor means illustrated in FIGS. 1 and 2.

Figure 4:
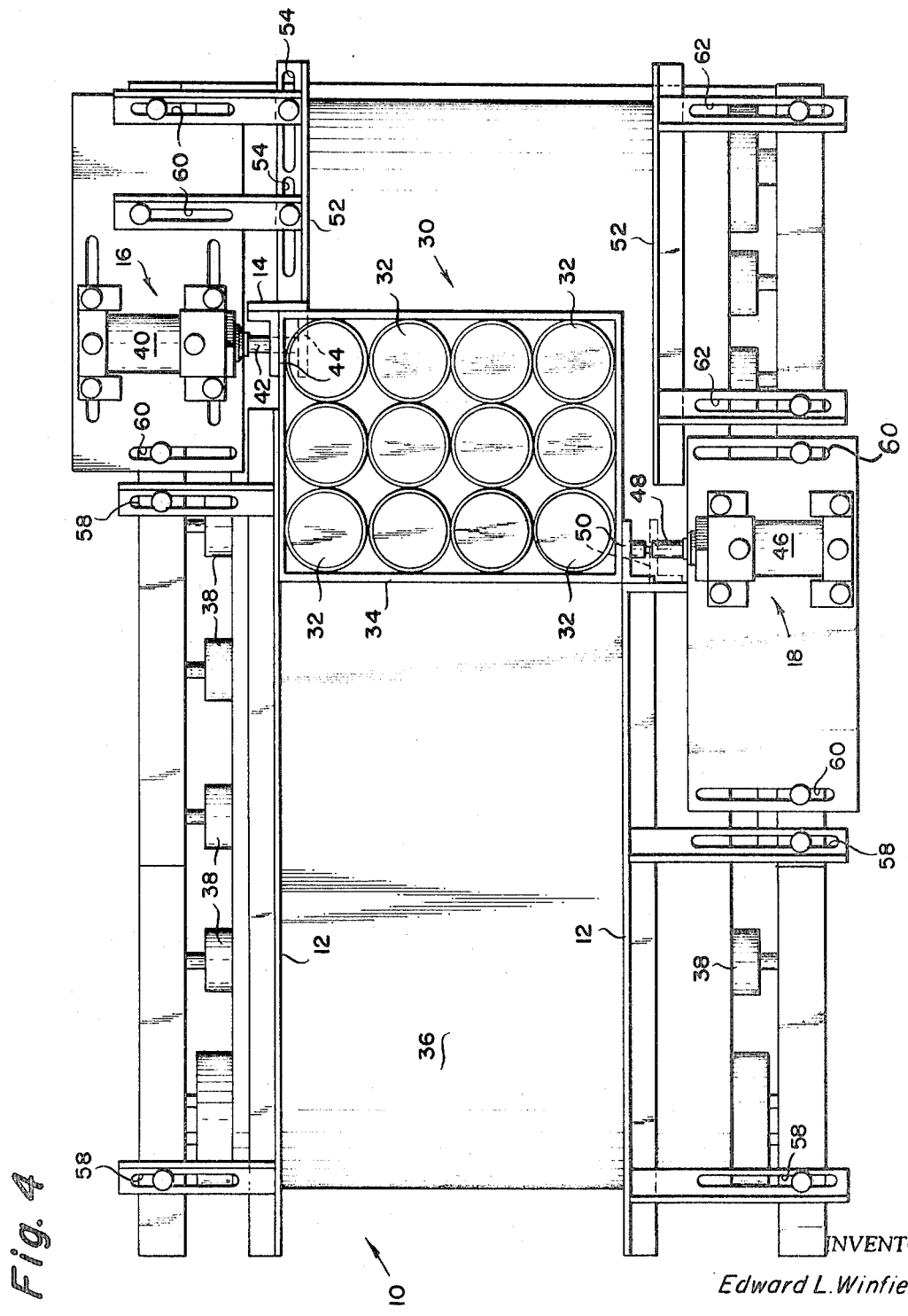
FIG. 4 is an enlarged plan view of the line conveyor of FIG. 1.

Referring now to FIG. 4, there crossfeed illustrated a typical article indicated generally at 30 which is to be conveyed by the apparatus of the present invention. Thus there is shown a plurality of cylindrical objects such as cans 32 loosely disposed in a tray or shipper 34. The articles are subsequently to be wrapped in heat shrinkable film such as is disclosed in Brown, U.S. Pat. No. 3,331,503 assigned to the common assignee of the present invention. After being delivered to the crossfeed conveyor 26 the article 30 is enveloped in a heat shrinkable film so as to hold the individual cans 32 securely within tray 34.

After a typical article 30 has been fed by guide members 12 into engagement with the stop abutment means 14, upon receipt of a release signal as will be described hereinafter, the article release means 16 and 18 are actuated in unison. Article release means 16 is shown to consist of a pneumatic cylinder 40 having a plunger 42 and a shoe 44 affixed to the outer edge thereof. It is preferred that the shoe 44 be of a size to contact only a portion of the side of the article 30 although larger shoes may be employed. Similarly, article release means 18 is shown to consist of another pneumatic cylinder 46 whose plunger 48 also is provided with a shoe or article-engaging member 50. After the pneumatic cylinders 40 and 46 have been actuated, the plungers 42 and 48 move so as to position the attached shoes 44 and 50 to the phantom position shown in FIG. 4 whereby the article 30 is moved laterally on the input line conveyor 10 so as to clear the stop abutment means 14 whereby the article is brought into engagement with guiding surfaces 52 on the input line conveyor 10 and is free to travel to the right in FIG. 4.

In order to locate the stop abutment 14, slots are provided at 54 so that the stop abutment member 14 may be longitudinally positioned. Slots 56 permit the stop abutment member 14 and associated guide 52 to be positioned laterally with respect to the input line conveyor 10. Similarly, the guide members 12 are positioned to suit the size of the article to be conveyed by means of slot and bolt arrangements 58. Slot and bolt arrangement 60 permits the article release means 16 and 18 to be positioned properly in a lateral sense with respect to the input line conveyor 10. Finally, slots 62 and associated bolts permit the guide surface 52 associated with the article release means 18 to be positioned properly.

Referring again to FIGS. 1 and 2, there is shown a main drive shaft 72 which is suitably mechanically coupled to the cross feed conveyor 26 such as is schematically indicated at 73 whereby the drive for the feed finger conveyor 24 is mechanically coupled to the crossfeed conveyor 26. A chain belt or timing belt 74 delivers the drive from main drive shaft 72 with the aid of pulleys 76 and 78 to the forward shaft 80 of the feed finger conveyor 24. Similarly, a chain belt 77 mechanically couples the drive to shaft 79 of the overlap conveyor 20. Finally, a sprocket and pulley arrangement indicated generally at 83 delivers the drive from the rear shaft 81 of the feed finger conveyor 24 to the driven shaft 85 for input line conveyor 10. In this manner, the input line conveyor 10, the overlap conveyor 20, and the feed finger conveyor 24 may be driven forward continuously while the cross feed conveyor 26 is driven intermittently but mechanically coupled thereto whereby any desired machine speed may be employed.

Figure 3:
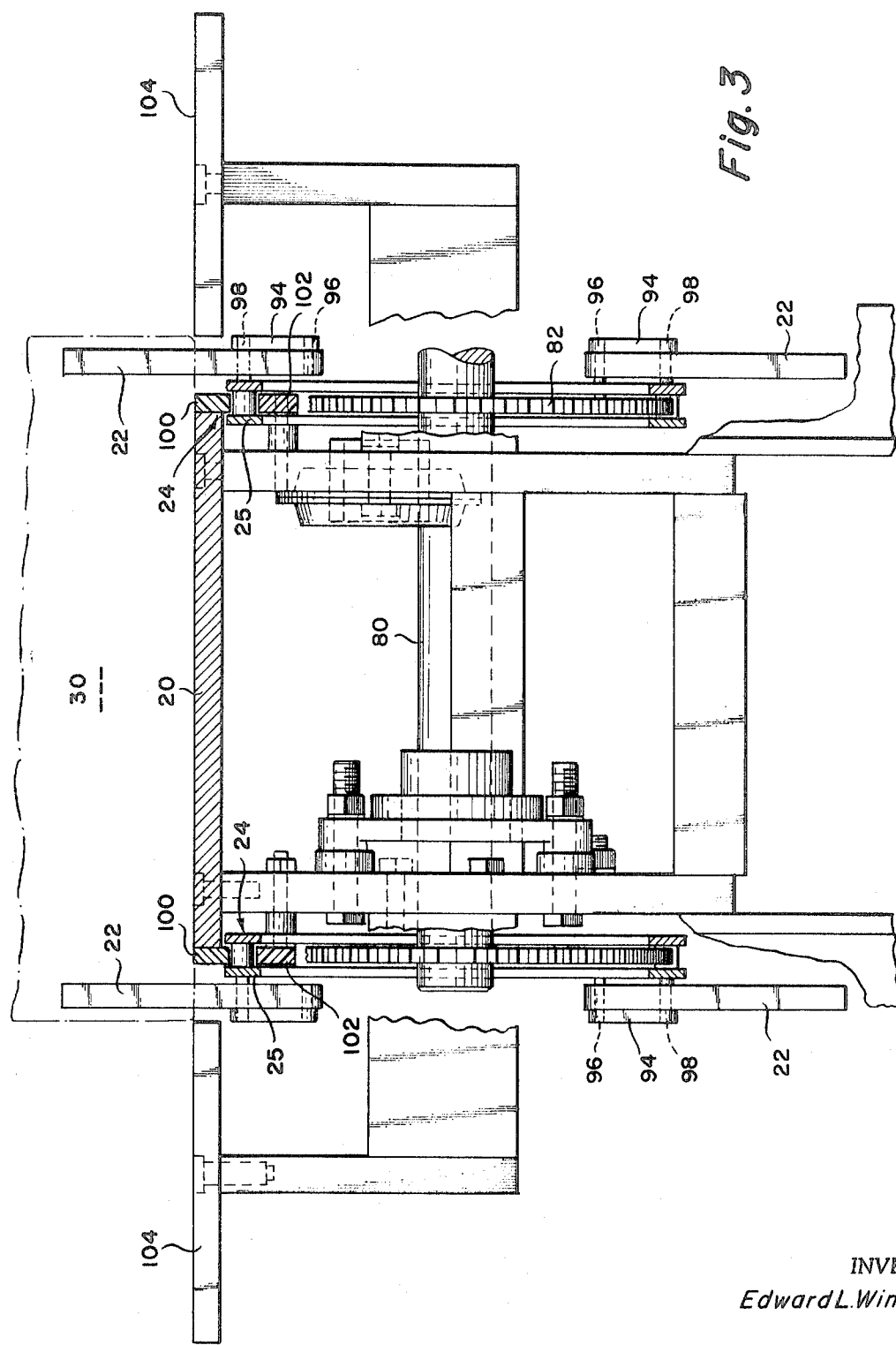
FIG. 3 is a cross-sectional view taken in vertical elevation along line 3—3 of FIG. 2, drawn to an enlarged scale and with parts broken away for purposes of illustration.
Figure 5:
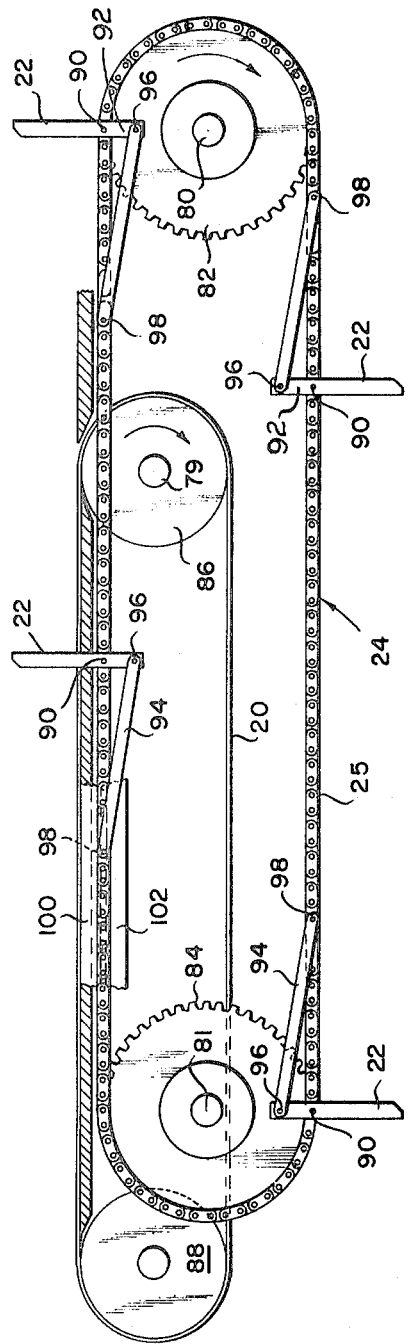
FIG. 5 is a fragmentary side elevational view with parts broken away and taken in cross section along line 5—5 of FIG. 1; and, FIG. 6 is a fragmentary kinematic layout drawing showing the progressive positions of a feed finger and attached lever of FIG. 5.
Figure 6:
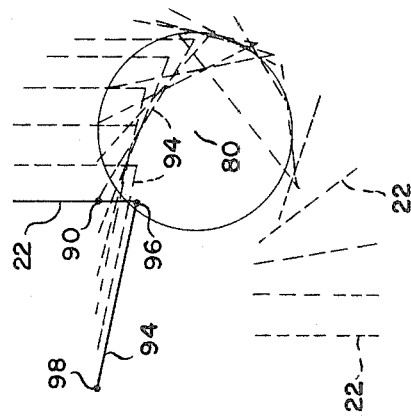

Referring now to FIG. 5, there is illustrated a more detailed showing for the feed fingers 22 on the feed finger conveyor means 24. Thus there is shown a forward sprocket 82 about which the chain belt 25 of the feed finger conveyor means 24 is entrained and a rear sprocket 84. Numerals 86 and 88 represent the forward and rear sprockets, respectively, for the overlap conveyor 20. Each feed finger 22 is attached at 90 to the marginal edge of the chain belt 25 of the feed finger conveyor means 24. Furthermore, each feed finger 22 has a lower portion 92 which extends below the chain belt 25 while the feed finger is in its upper flight in article engaging position. A lever 94 is attached at its forward end at 96 to the lower portion 92 of an associated feed finger 22 and attached at its rearward end at 98 to the marginal edge of the chain belt 25. As can be seen best in FIGS. 3 and 5, an upper guide rail 100 and a lower guide rail 102 located inboard of platens 104 support the chain belt 25 of the feed finger conveyor means 24 for purposes of maintaining the feed fingers 22 substantially vertical and also to maintain the travel of feed fingers 22 in a horizontal plane. Guide rails 102 and 104 are preferably made from polytetraflouroethylene. This vertical position is maintained not only during the forward horizontal feed of feed fingers 22 but also during substantially all of the fall off the feed fingers 22 of the rounded portion of the forward sprocket 82. This relationship is indicated by the kinematic layout in velocity 6 which shows the relative position for an individual feed finger 22 and an associated lever 94 throughout its entry into and exit from the forward sprocket 82. Therefore, the article being transferred from feed conveyor means 24 to the crossfeed conveyor is decelerated immediately prior to transfer to the crossfeed conveyor 26. The horizontal spacing between each of the positions for the feed finger 22 in FIG. 6 is a quantitative measure of the relative velocity of the feed finger 22 between incremental positions. The kinematic layout also shows that there is only a very slight projection of an individual feed finger beyond the forward sprocket 82 whereby the feed conveyor means may be positioned extremely close to the crossfeed conveyor 26 and still permit the feed fingers to pass over sprocket 82.

Referring now to FIG. 2, there is illustrated a cam 106 which is mounted for rotation on shaft 80 on which the forward sprocket 82 of the feed finger means 24 also rotates. By suitable and conventional means, not shown, a signal is taken from cam 106 such as by actuation of microswitch means, not shown, in order to provide a release signal for the article release means 16 and 18 whereby each of the shoes 44, 50 may move downwardly in each of FIGS. 1 and 4 as from the solid position to the phantom position in FIG. 4. This, in turn, causes an article 30 to move transversely on the input line conveyor 10 thereby effecting a release of the article 30 from the stop abutment means 14 and permitting it to be advanced forwardly to the right on the input line conveyor and where it may be transferred smoothly to the continuously rotating overlap conveyor 20.

In operation, an article or tray to be fed is guided by guide members 12 on the input conveyor means 10 into engagement with a stop abutment means 14. Each rotation of shaft 80 produces a signal from cam 106 mounted thereon so as to provide a release signal for article release means 16 and 18 which comprise, in a preferred form, pneumatic cylinders 40 and 46. Upon receipt of the article release signal, the pneumatic cylinders 40 and 46 are actuated in unison to move from the solid to the phantom position in FIG. 4 thereby moving the article 30 out of engagement with the stop abutment means 14 permitting it to be moved forward by the continuously moving input line conveyor 10 where it is transferred to the overlap conveyor 20 and then to the feed finger conveyor means 24.

During the latter part of feed by the feed finger conveyor means 24 the articles are decelerated as the feed fingers 22 traverse their forward sprocket member 82. However, by virtue of the manner in which the feed finger is supported and guided by lever 94 which in turn is guided within upper and lower guide rails 100 and 102, respectively, the feed fingers 22 are maintained substantially vertical and do not project substantially beyond the forward end of the forward sprocket 82 adjacent the cross feed conveyor 26. Therefore, the plurality of articles 32 in the tray member 30 may be fed smoothly and without being shocked so as to topple the cylindrical objects or cans 32 within tray 34 to the crossfeed conveyor 26 on which they may be subjected to subsequent operations, for example, the envelopment by a heat shrinkable film and passage through a heat shrink tunnel.

The use of oppositely mounted dual operating pneumatic cylinders provides reliability of operation and ensures against skewing of the article or tray to be fed forward on the input conveyor. The input conveyor must be sufficiently wide so as to permit an offset or jog in the direction of forward feed. The apparatus permits adjustment of the abutment stop means as well as the guide means 12 and 52 on the input line conveyor 10. It has been found in a specific embodiment that by using four pairs of feed fingers 22 on the feed finger conveyor means 24 that a finger spacing of over twice the tray length is obtained whereby timing is not critical.

While presently preferred embodiments of the present invention have been illustrated and described, it will be recognized that the invention may be otherwise variously embodied and practiced.

What is claimed is:

1. An apparatus for feeding articles from one conveyor means to another conveyor means at right angles thereto comprising:
   a. a first conveyor means for feeding articles in a first direction,
   b. abutment means for stopping the feed of articles by said first conveyor means,
   c. a first article release means movable laterally with respect to said first conveyor means and engageable with articles stopped by said abutment means,
      1. said first article release means being capable of moving an article laterally on said first conveyor means in order to clear said abutment means,
      2. means, including said first article release means, engageable with an article on said first conveyor means in a plurality of longitudinally spaced positions for moving said article laterally so as to prevent skewing of said article on said first conveyor means,
   d. a second conveyor means capable of receiving articles released by said first article release means,
      1. said second conveyor means moving in a direction at right angles to said first direction,
   e. and continuously advancing means for transferring said articles which have cleared said abutment means directly to said second conveyor means.

2. An apparatus for feeding articles from one conveyor means to another conveyor means at right angles thereto as defined in claim 1, wherein said continuously advancing means for transferring said articles which have cleared said abutment means to said conveyor means comprises finger feed means and a third conveyor means to feed articles which have cleared said abutment means to said finger feed means.

3. An apparatus for feeding articles from one conveyor means to another conveyor means at right angles thereto as defined in claim 2, wherein said feed finger means include a plurality of pairs of feed fingers mounted on a fourth conveyor means, said third conveyor means including a sprocket member at the forward end thereof adjacent said second conveyor means, and wherein said feed finger means are provided with control means for maintaining said feed fingers substantially vertical as they travel over said forward sprocket member.

4. An apparatus for feeding articles from one conveyor means to another conveyor means at right angles thereto as defined in claim 3, wherein each feed finger is attached intermediate its end to a marginal edge portion of said fourth conveyor means thereby providing a lower portion thereof which extends below the marginal edge of said third conveyor means and lever means having one end attached to said lower portion of said feed finger and the other end attached rearwardly to a marginal edge portion of said third conveyor means thereby providing said control means for maintaining said feed fingers substantially vertical as they travel over said forward sprocket member.

5. An apparatus for feeding articles form one conveyor means to another conveyor means at right angles thereto as defined in claim 12, including means engaging the marginal edge portion of said fourth conveyor means for maintaining the marginal edge portions thereof in a horizontal plane as said article is being fed forward and thereby helping to maintain said feed fingers substantially vertical.

6. An apparatus for feeding articles from one conveyor means to another conveyor means at right angles thereto as defined in claim 5, wherein said means for maintaining the marginal edge portions of said fourth conveyor means in a horizontal plane consists of a pair of vertically spaced parallel track members, said track members serving to guide the rearwardly attached end of said lever means when said one end of said lever means reaches said forward sprocket member.

7. An apparatus for feeding articles from one conveyor means to another conveyor means at right angles thereto comprising:
  a. a first conveyor means for feeding articles in a first direction,
  b. abutment means for stopping the feed of articles by said first conveyor means,
  c. a first article release means movable laterally with respect to said first conveyor means and engageable with articles stopped by said abutment means,
    1. said first article release means being capable of moving an article laterally on said first conveyor means in order to clear said abutment means,
    2. means to prevent skewing of an article on said first conveyor means when said article is being released by said first article release means,
      i. said means to prevent skewing of said article constitutes a second article release means engageable with one side of a stopped article and said first article release means is engageable with an opposite side of a stopped article,
  d. a second conveyor means capable of receiving articles released by said first article release means,
    1. said second conveyor means moving in a direction at right angles to said first direction,
  e. and means for transferring said articles which have cleared said abutment means to said second conveyor means.

8. An apparatus for feeding articles from one conveyor means to another conveyor means at right angles thereto as defined in claim 7, wherein said first and second article release means consist of pneumatic cylinders which are actuated in unison.

9. An apparatus for feeding articles from one conveyor means to another conveyor means at right angles thereto as defined in claim 8, including means to actuate said pneumatic cylinders in timed sequence with said finger feed means.

10. An apparatus for feeding articles from one conveyor means to another conveyor means at right angles thereto as defined in claim 9, wherein said finger feed means moves forward continuously and said second conveyor means is fed forward intermittently and means for mechanically tying said finger feed means to said second conveyor means.

* * * * *